United States Patent [19]
Rothenberg

[11] Patent Number: 5,432,850
[45] Date of Patent: Jul. 11, 1995

[54] METHOD AND APPARATUS FOR SECURE DATA TRANSMISSION

[75] Inventor: Michael Rothenberg, Ramat Gan, Israel

[73] Assignee: Lannet Data Communications Ltd., Tel Aviv, Israel

[21] Appl. No.: 84,180

[22] Filed: Jun. 30, 1993

[30] Foreign Application Priority Data

Jul. 2, 1992 [IL] Israel ................................ 102394

[51] Int. Cl.$^6$ ........................... H04L 9/32; H04L 9/00
[52] U.S. Cl. ............................................ 380/23; 380/4; 380/9; 380/21; 380/25; 380/49; 340/825.31; 340/825.34
[58] Field of Search ................... 380/9, 21, 28, 33, 43, 380/48–50, 23, 4, 25; 340/825.31, 825.34

[56] References Cited

U.S. PATENT DOCUMENTS 4,418,425 11/1983 Fennel, Jr. et al. ............... 380/33
4,860,352 8/1989 Laurance et al. ............... 380/23

OTHER PUBLICATIONS

B. J. Herbjson, "Developing Ethernet Enhanced-Security System", 29 Jul., 1988, pp. 1-2.
The Xerox Encryption Unit, Protection for Classified Information . . . , (Brochure), 1988.
SynOptics Communications, Inc., news release, Mar. 10, 1992 Network Week, Issue 14, Mar. 27, 1993, pp. 1-3.

Primary Examiner—Bernarr E. Gregory
Attorney, Agent, or Firm—Sixbey, Friedman, Leedom & Ferguson; David S. Safran

[57] ABSTRACT

A method for secure transmission of data having a destination address and a source address on a shared communication network comprising the steps of transmitting a multiplicity of data frames, each containing at least an encrypted data sequence employing the destination address as at least part of a decryption key therefor, receiving the multiplicity of data frames at a receiver on the shared communication network and attempting to decrypt the encrypted data sequence by employing the local address of the receiver as at least part of a decryption key.

24 Claims, 4 Drawing Sheets

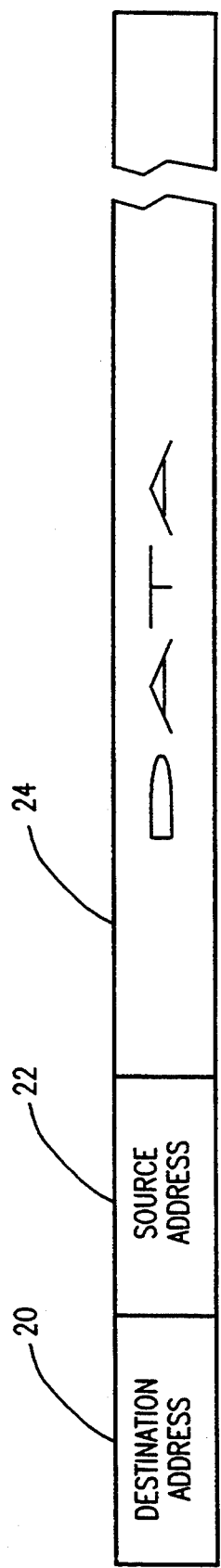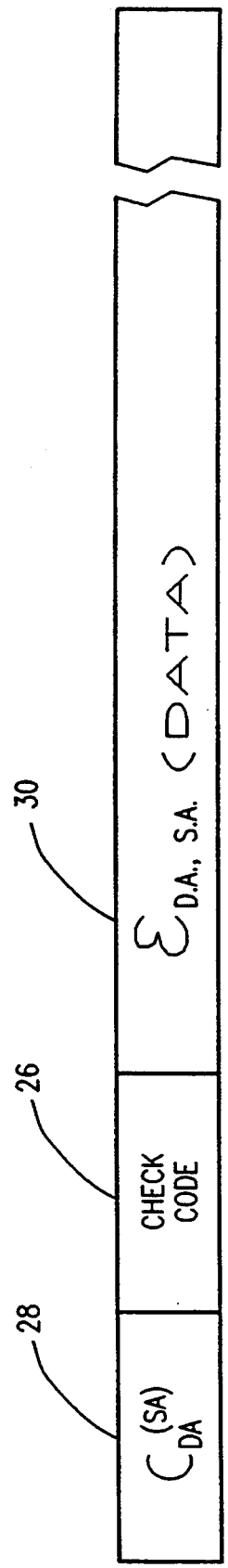
FIG.2A
FIG.2B

METHOD AND APPARATUS FOR SECURE DATA TRANSMISSION

FIELD OF THE INVENTION

The present invention relates to data transmission apparatus and methods generally and more particularly to methods and apparatus for secure data transmission.

BACKGROUND OF THE INVENTION

Various apparatus and techniques are known for secure transmission of data. A news release dated Mar. 10, 1992 of SynOptics Communications, Inc. describes a technology which provides data privacy and control for Ethernet local area networks. The technology, as described in the news release, does not provide encryption/decryption but rather only provides access control which may complement existing encryption and other security techniques. By using the technology proposed by SynOptics, only the intended destination receives a packet of data. Unauthorized stations attempting to access this data will see only meaningless data.

There are described in the Mar. 27, 1992 issue of Network Week, various patents of Synoptics and 3Com relating to security on Ethernet networks.

SUMMARY OF THE INVENTION

The present invention seeks to provide a method and apparatus for secure transmission of data which overcomes many of the limitations of the prior art.

There is thus provided in accordance with a preferred embodiment of the present invention, a method for secure transmission of data having a destination address and a source address on a shared communication network including the steps of transmitting a multiplicity of data frames, each containing at least an encrypted data sequence employing the destination address as at least part of a decryption key therefor, receiving the multiplicity of data frames at a receiver on the shared communication network, and attempting to decrypt the encrypted data sequence by employing the local address of the receiver as at least part of a decryption key.

In accordance with a preferred embodiment of the invention, the multiplicity of data frames each also contains an address check sequence, and including the further step of employing, prior to the step of attempting to decrypt, the address check sequence and the source address to verify that the local address of the receiver is identical to the destination address.

In a preferred embodiment of the present invention, the method for secure transmission further includes the step of preventing the receiver from receiving the transmission upon failure to verify that the local address of the receiver is identical to the destination address.

In a preferred embodiment of the invention, the multiplicity of data frames each also contains an encrypted source address sequence employing the destination address as at least part of a decryption key, and wherein the method also includes the step of employing the local address of the receiver to attempt to decrypt the encrypted source address sequence.

In accordance with a preferred embodiment of the invention, the method for secure transmission also includes the step of employing the decrypted source address as part of a decryption key to decrypt the data sequence.

There is further provided, in accordance with a preferred embodiment of the invention, a method for secure transmission of data on a shared communication network including the steps of transmitting a multiplicity of data frames, each containing at least an encrypted data sequence, receiving the multiplicity of data frames at a receiving location on the shared communication network, and attempting to decrypt the data sequence.

Preferably, the shared communication network includes an Ethernet type network.

There is further provided, in accordance with a preferred embodiment of the invention, apparatus for secure transmission of data having a destination address and a source address on a shared communication network, the apparatus including a transmitter, operative for transmitting a multiplicity of data frames, each containing at least an encrypted data sequence employing the destination address as at least part of a decryption key therefor, a decrypter, operative for attempting to decrypt the encrypted data sequence by employing the local address of the receiver as at least part of a decryption key, and a receiver, which receives the multiplicity of data frames on the shared communication network after decryption thereof.

In a preferred embodiment of the invention, the multiplicity of data frames each also contains an address check sequence, and the decrypter includes apparatus for employing the address check sequence and the source address to verify that the local address of the receiver is identical to the destination address prior to attempting to decrypt.

Preferably, the decrypter is operative, upon failure to verify that the local address of the receiver is identical to the destination address, to prevent the receiver from receiving the transmission.

In a preferred embodiment of the invention, the multiplicity of data frames each also contains an encrypted source address sequence employing the destination address as at least part of a decryption key, and the decrypter also contains means for employing the local address of the receiver to attempt to decrypt the encrypted source address sequence.

Preferably, the apparatus further includes means for employing the decrypted source address as part of a decryption key to decrypt the data sequence.

There is further provided, in accordance with a preferred embodiment of the invention, apparatus for secure transmission of data on a shared communication network including apparatus for transmitting a multiplicity of data frames, each containing at least an encrypted data sequence, apparatus for receiving the multiplicity of data frames at a receiving location on the shared communication network, and apparatus for attempting to decrypt the data sequence.

Preferably, the shared communication network is an Ethernet-type network.

BRIEF DESCRIPTION OF THE DRAWINGS

The present invention will be understood and appreciated more fully from the following detailed description, taken together with the drawings in which:

FIGS. 2A and 2B are illustrations of respective unencrypted and encrypted data sequences in accordance with a preferred embodiment of the present invention;

DETAILED DESCRIPTION OF A PREFERRED EMBODIMENT

Figure 1:
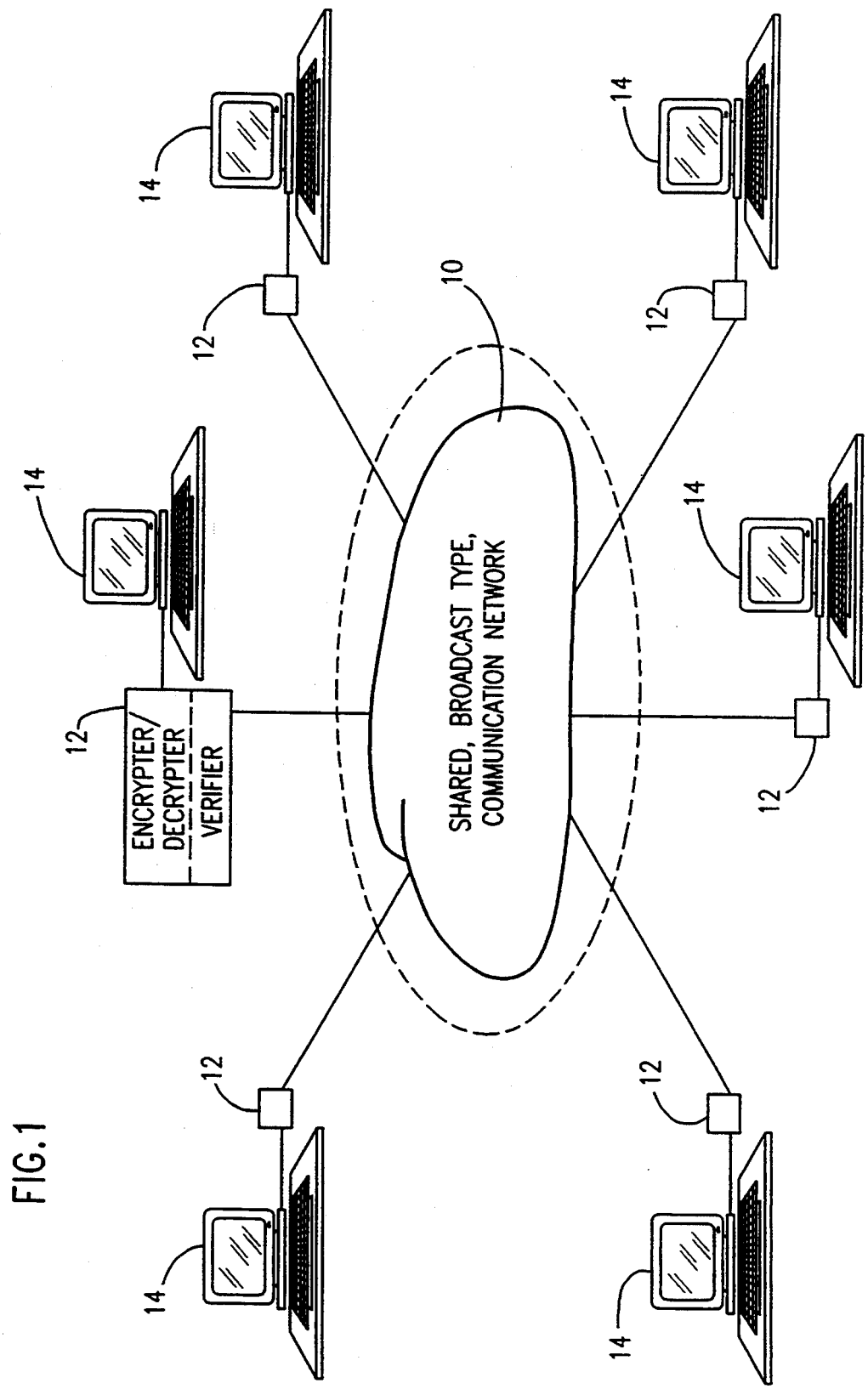
FIG. 1 is a simplified illustration of a shared broadcast type communication network constructed and operative in accordance with a preferred embodiment of the invention.

Reference is now made to FIG. 1, which illustrates a network security system constructed and operative in accordance with a preferred embodiment of the present invention. The system includes a shared, broadcast type, communication network 10, such as Ethernet wherein each transmitting station broadcasts to all other stations in the network.

In accordance with a preferred embodiment of the present invention, the shared, broadcast type, communication network 10 is operative to "broadcast" signals which are encrypted by an encryptor/decrypter 12 associated with a transmitting remote terminal 14 and which can only be decrypted by the intended recipient thereof, i.e. encryptor/decrypter 12 associated with a predetermined one or more of remote terminals 14, and having physically secure communication therewith.

It is to be appreciated that the shared broadcast type communication network 10 may be of any suitable configuration including a star configuration having a single hub or multiple hubs which are interconnected by secure or non-secure communications links. The communication network may be an Ether net-type network. The encryptor/decrypter may be located physically inside a hub or a remote terminal or may be physically remote therefrom and connected thereto by a secure communication link or within a secure environment.

Reference is now made to FIG. 2A which illustrates a typical data frame prior to encryption in accordance with a preferred embodiment of the invention. Such a data frame includes, inter alia, a destination address 20, a source address 22 and data 24. In accordance with a preferred embodiment of the present invention, this data frame is encrypted to include, inter alia, an address check sequence 26, an encrypted source address sequence 28 and an encrypted data sequence 30.

Figure 3:
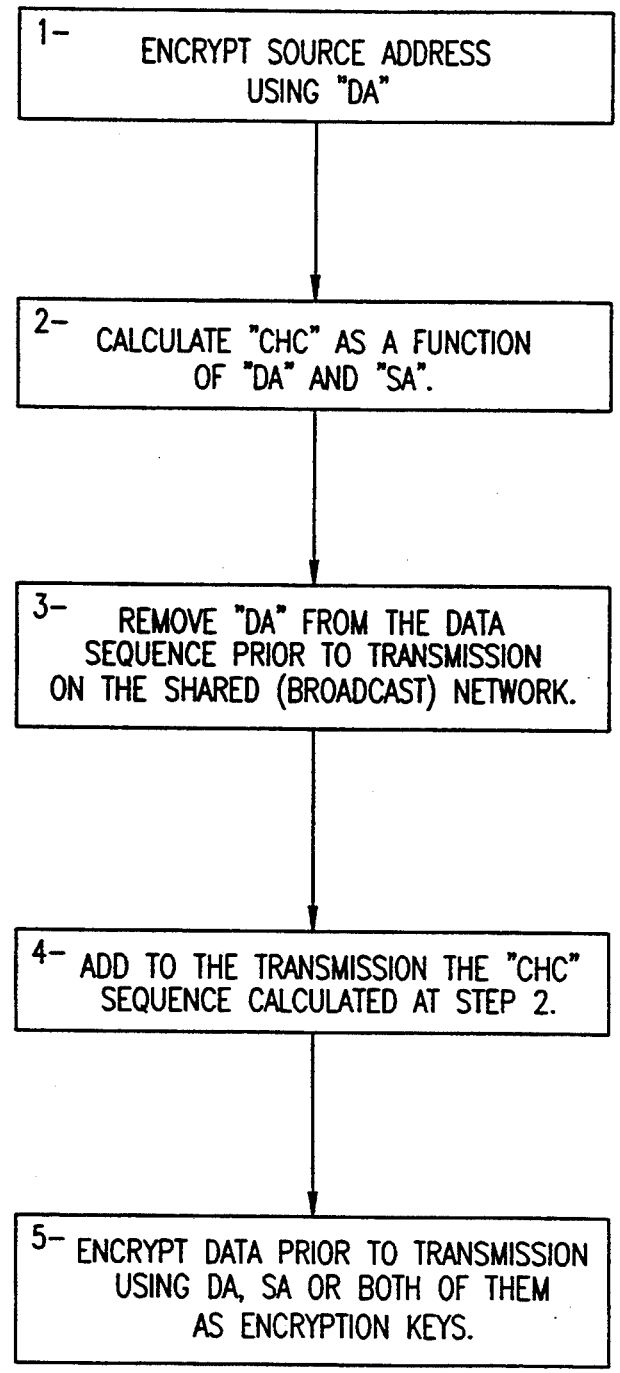
FIG. 3 is a flow chart illustration of an encryption algorithm constructed and operative in accordance with a preferred embodiment of the present invention.

An encryption algorithm useful in accordance with a preferred embodiment of the invention is summarized in FIG. 3. As seen in FIG. 3, the algorithm encrypts the source address 22 using the destination address 20 and then employs both the destination address and the encrypted source address 28 to create check code "CHC" sequence 26. The destination address is then removed from the frame prior to transmission and the CHC sequence is added thereto. The data 24 is encrypted using one or both of the destination address and the source address as encryption keys.

Figure 4:
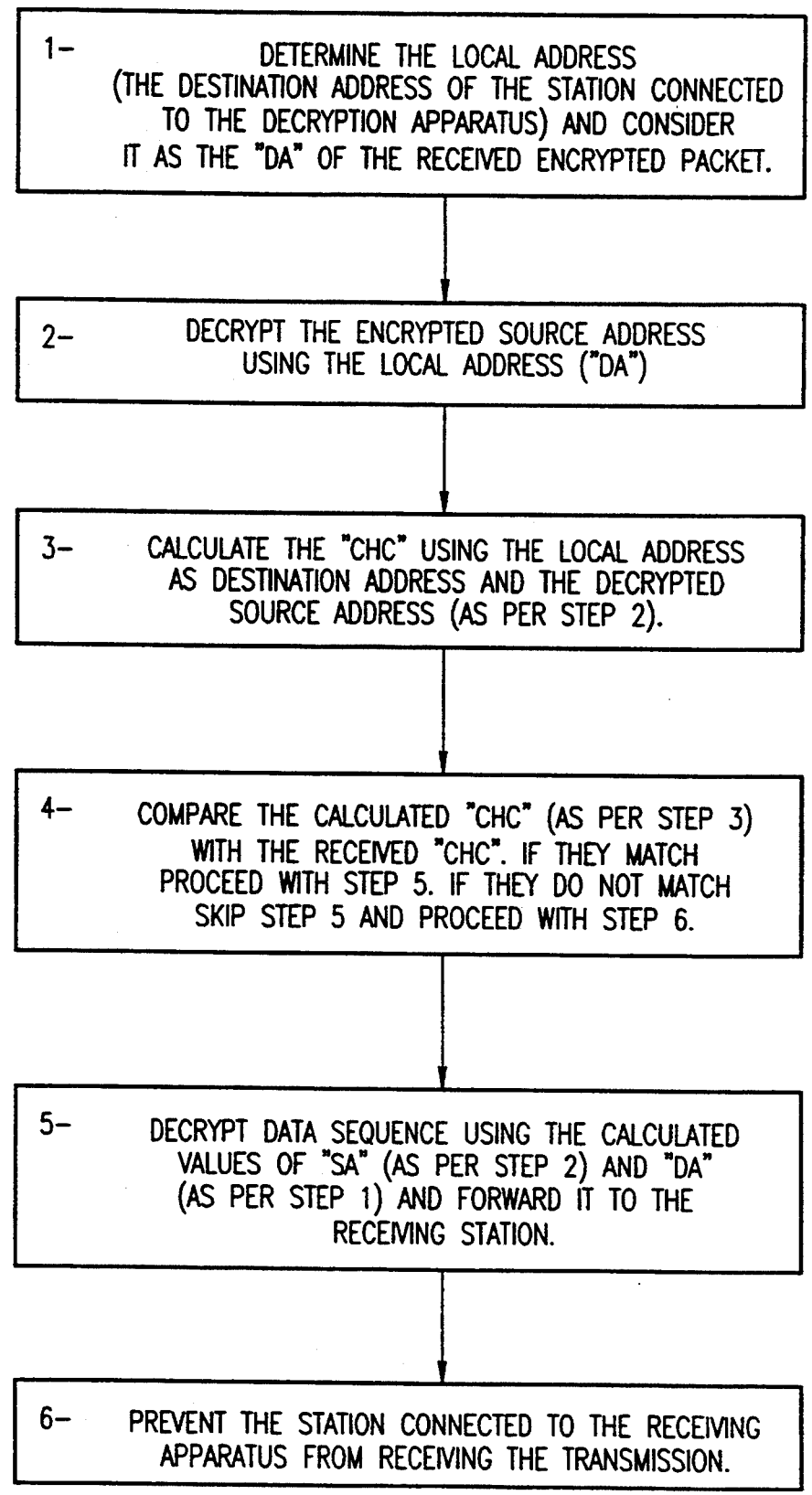
FIG. 4 is a flow chart illustration of a decryption algorithm constructed and operative in accordance with a preferred embodiment of the present invention.

A decryption algorithm which is useful in accordance with a preferred embodiment of the invention is summarized in FIG. 4. The destination address of the local terminal to which the decrypter is connected is used, in order to decrypt the encrypted source address.

The source address and the destination address are used to calculate the CHC check code. If the calculated CHC code matches the received CHC, the data sequence is decoded using the source address and the destination address and forwarded to the receiving terminal associated with the decrypter.

If the calculated CHC does not match the received CHC, the terminal is prevented from receiving the transmission. In one embodiment of the invention the transmission is replaced by meaningless data.

In accordance with an alternative embodiment of the present invention, the CHC may be eliminated from the encryption and decryption algorithms.

In accordance with an embodiment of the invention, the source address need not be involved in encryption and decryption and only the local address of the receiver is employed as part of a decryption key used in decrypting the data sequence.

It will be appreciated by persons skilled in the art that the present invention is not limited by what has been particularly shown and described hereinabove. Rather the scope of the present invention is defined only by the claims which follow:

I claim:

1. A method for secure transmission of data having a destination address and a source address on a shared communication network comprising the steps of: transmitting a multiplicity of data frames, each containing at least an encrypted data sequence, said multiplicity of data frames also containing an address check sequence;
   receiving the multiplicity of data frames at a receiver on the shared communication network;
   employing the address check sequence and the source address to verify that the local address of the receiver is identical to the destination address; and
   performing a decryption operation on the encrypted data sequence of verified data frames.

2. A method according to claim 1 and including the step of preventing the receiver from receiving the transmission upon failure to verify that the local address of the receiver is identical to the destination address.

3. A method according to claim 2 wherein said encrypted data sequence also employs the destination address as at least part of the key therefor and wherein the step of performing a decryption operation utilizes the local address of the receiver as at least part of a decryption key for decryption purposes.

4. A method according to claim 2 wherein said multiplicity of data frames each also contains an encrypted source address sequence employing the destination address as at least part of a decryption key, and wherein the step of performing a decryption operation also comprises the step of:
   employing the local address of the receiver as part of a decryption key to decrypt the encrypted source address sequence.

5. A method according to claims 4 and wherein the step of performing a decryption operation also comprising the step of:
   employing the decrypted source address as part of a decryption key to decrypt the data sequence.

6. A method according to claim 5 wherein said encrypted data sequence also employs the destination address as at least part of the key therefor and wherein the step of performing a decryption operation utilizes the local address of the receiver as at least part of a decryption key for decryption purposes.

7. A method according to claim 4 wherein said encrypted data sequence also employs the destination address as at least part of the key therefor and wherein the step of performing a decryption operation utilizes the local address of the receiver as at least part of a decryption key for decryption purposes.

8. A method according to claim 1 wherein said multiplicity of data frames each also contains an encrypted source address sequence employing the destination address as at least part of a decryption key, and wherein the step of performing a decryption operation also comprises the step of:

employing the local address of the receiver as part of a decryption key to decrypt the encrypted source address sequence.

9. A method according to claim 8 and wherein the step of performing a decryption operation also comprising the step of:

employing the decrypted source address as part of a decryption key to decrypt the data sequence.

10. A method according to claim 9 wherein said encrypted data sequence also employs the destination address as at least part of the key therefor and wherein the step of performing a decryption operation utilizes the local address of the receiver as at least part of a decryption key for decryption purposes.

11. A method according to claim 8 wherein said encrypted data sequence also employs the destination address as at least part of the key therefor and wherein the step of performing a decryption operation utilizes the local address of the receiver as at least part of a decryption key for decryption purposes.

12. A method according to claim 1 wherein said encrypted data sequence also employs the destination address as at least part of the key therefor and wherein the step of performing a decryption operation utilizes the local address of the receiver as at least part of a decryption key for decryption purposes.

13. Apparatus for secure transmission of data having a destination address and a source address on a shared communication network comprising:

a transmitter which transmits a multiplicity of data frames, each containing at least an encrypted data sequence, said multiplicity of data frames also containing an address check sequence;

a verifier which receives the encrypted data sequence and employs the address check sequence and the source address to verify that the local address of the receiver is identical to the destination address;

a decrypter, which receives the verified data frames and performs a decryption operation thereon; and a receiver, which receives said multiplicity of data frames on said shared communication network after decryption thereof.

14. Apparatus according to claim 13 and wherein said decrypter prevents the receiver from receiving the transmission upon failure to verify that the local address of the receiver is identical to the destination address.

15. Apparatus according to claim 14 and wherein said multiplicity of data frames each also contains an encrypted source address sequence employing the destination address as at least part of a decryption key, and wherein said decrypter employs the local address of the receiver to decrypt the encrypted source address sequence.

16. Apparatus according to claim 15 wherein the decrypter also employs the decrypted source address as part of a decryption key to decrypt the data sequence.

17. Apparatus according to claim 16 wherein said encrypted data sequence also employs the destination address as at least part of the key therefor and wherein the decrypter employs the local address of the receiver as at least part of a decryption key for decryption purposes.

18. Apparatus, according to claim 15 wherein said encrypted data sequence also employs the destination address as at least part of the key therefor and wherein the decrypter employs the local address of the receiver as at least part of a decryption key for decryption purposes.

19. Apparatus according to claim 14 wherein said encrypted data sequence also employs the destination address as at least part of the key therefor and wherein the decrypter employs the local address of the receiver as at least part of a decryption key for decryption purposes.

20. Apparatus according to claim 13 and wherein said multiplicity of data frames each also contains an encrypted source address sequence employing the destination address as at least part of a decryption key, and wherein said decrypter employs the local address of the receiver to decrypt the encrypted source address sequence.

21. Apparatus according to claim 20 wherein the decrypter also employs the decrypted source address as part of a decryption key to decrypt the data sequence.

22. Apparatus according to claim 21 wherein said encrypted data sequence also employs the destination address as at least part of the key therefor and wherein the decrypter employs the local address of the receiver as at least part of a decryption key for decryption purposes.

23. Apparatus according to claim 20 wherein said encrypted data sequence also employs the destination address as at least part of the key therefor and wherein the decrypter employs the local address of the receiver as at least part of a decryption key for decryption purposes.

24. Apparatus according to claim 13 wherein said encrypted data sequence also employs the destination address as at least part of the key therefor and wherein the decrypter employs the local address of the receiver as at least part of a decryption key for decryption purposes.

* * * * *